(12) United States Patent
Bastien et al.

(10) Patent No.: US 11,757,317 B2
(45) Date of Patent: Sep. 12, 2023

(54) ROTOR WITH ARCUATE MAGNETS

(71) Applicant: Nidec Motor Corporation, St. Louis, MO (US)

(72) Inventors: Ryan M. Bastien, St. Charles, MO (US); Lunjie Lu, Chesterfield, MO (US)

(73) Assignee: Nidec Motor Corporation, St. Louis, MO (US)

( * ) Notice: Subject to any disclaimer, the term of this patent is extended or adjusted under 35 U.S.C. 154(b) by 0 days.

(21) Appl. No.: 17/936,217

(22) Filed: Sep. 28, 2022

(65) Prior Publication Data
US 2023/0028450 A1 Jan. 26, 2023

Related U.S. Application Data

(63) Continuation-in-part of application No. 17/212,145, filed on Mar. 25, 2021, now abandoned.

(51) Int. Cl.
*H02K 1/27* (2022.01)
*H02K 1/28* (2006.01)
*H02K 1/276* (2022.01)

(52) U.S. Cl.
CPC ............. *H02K 1/2773* (2013.01); *H02K 1/28* (2013.01); *H02K 2213/03* (2013.01)

(58) Field of Classification Search
CPC .... H02K 1/2773; H02K 1/28; H02K 2213/03; H02K 1/2766
See application file for complete search history.

(56) References Cited

U.S. PATENT DOCUMENTS

| | | | |
|---|---|---|---|
| 2009/0127961 A1* | 5/2009 | Pedersen | H02K 1/276 29/598 |
| 2014/0001910 A1* | 1/2014 | Shibata | H02K 1/2773 310/156.43 |
| 2015/0372547 A1* | 12/2015 | Kifuji | H02K 1/2766 310/156.01 |
| 2020/0169133 A1 | 5/2020 | Kim et al. | |

* cited by examiner

*Primary Examiner* — Thomas Truong
(74) *Attorney, Agent, or Firm* — Hovey Williams LLP

(57) ABSTRACT

A spoked rotor is rotatable about an axis. The rotor includes a core. The core includes a plurality of pole segments arranged arcuately about the axis. The rotor includes a plurality of arcuately arranged magnets alternating arcuately with the pole segments, such that each of the magnets is at least in part interposed between a pair of adjacent pole segments. Each of the magnets includes a curved section extending arcuately between radially inner and outer curved section ends. An effective rotor pole location is defined on each of the pole segments. Each of the pole segments has an end opposite the effective rotor pole location. A center point is defined at the pole segment end. Each of the effective rotor pole locations is arcuately offset from a corresponding one of the center points by between about five tenths (0.5) rotor poles and about two (2.0) rotor poles.

20 Claims, 13 Drawing Sheets

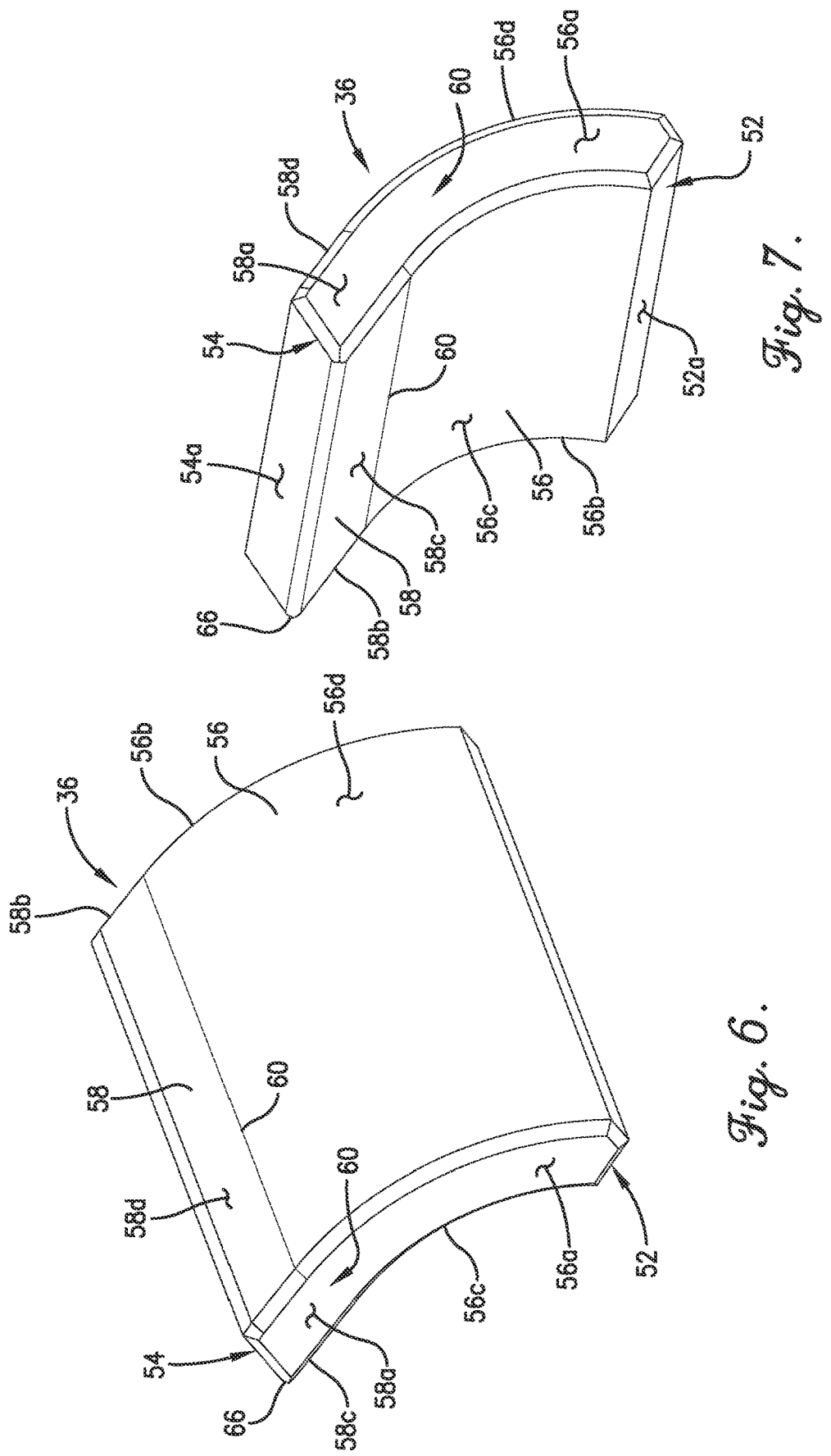

ROTOR WITH ARCUATE MAGNETS

CROSS-REFERENCE TO RELATED APPLICATIONS

1. Priority Applications

The present application is a continuation-in-part of U.S. patent application Ser. No. 17/212,145, filed Mar. 25, 2021, the entire disclosure of which is hereby incorporated by reference herein.

BACKGROUND OF THE INVENTION

1. Field of the Invention

The present invention relates generally to an electric motor. More particularly, the motor includes a plurality of arcuately arranged magnets configured and arranged to provide improved magnetic flux.

2. Discussion of the Prior Art

Electric motors conventionally comprise a stator and a rotatable rotor. Such motors may be inner rotor motors, outer rotor motors, or dual rotor motors. Furthermore, a variety of rotor and stator configurations are permissible. Among other alternatives, for instance, the rotor might comprise a rotor can supporting a plurality of arcuately arranged magnets, a plurality of arcuately arranged magnets alternating with a plurality of arcuately arranged pole segments, or a rotor core with a plurality of magnets arranged arcuately around a perimeter thereof. Pole segment, magnet, and stator tooth geometry may vary according to desired performance characteristics, space constraints, and cost considerations.

SUMMARY

According to one aspect of the present invention, a spoked rotor is rotatable about an axis. The rotor includes a core including a plurality of pole segments arranged arcuately about the axis. The rotor further includes a plurality of arcuately arranged magnets alternating arcuately with the pole segments, such that each of the magnets is at least in part interposed between a pair of adjacent pole segments. Each of the magnets includes a curved section extending arcuately between radially inner and outer ends.

According to another aspect of the present invention, a rotor is rotatable about an axis. The rotor includes a core including a plurality of pole segments arranged arcuately about the axis. The rotor further includes a plurality of arcuately arranged magnets alternating arcuately with the pole segments, such that each of the magnets is at least in part interposed between a pair of adjacent pole segments. An effective rotor pole location is defined on each of the pole segments. Each of the pole segments has an end opposite the effective rotor pole location. A center point is defined at the end. Each of the effective rotor pole locations is arcuately offset from a corresponding one of the center points by between about five tenths (0.5) rotor poles and about two (2.0) rotor poles.

Among other things, provision of (1) rotor magnets each having a curved section having first and second ends, wherein the second end is disposed radially outward of the first end, and/or (2) a core and magnets configured such that each of a plurality of effective rotor pole locations is arcuately offset by between about five tenths (0.5) rotor poles and about two (2.0) rotor poles from a corresponding one of a plurality of center points enables improved motor performance (e.g., via excellent flux concentration) to be achieved within a given motor envelope in comparison to a conventional spoked motor configuration. It is particularly noted that the inventive aspects of the present invention facilitate excellent cost vs. efficiency outcomes in some circumstances that would otherwise require costly upgrades to magnet material (e.g., rare earth magnets rather than ferrite magnets) and/or the addition of expensive additional active material (copper, steel, etc.).

This summary is provided to introduce a selection of concepts in a simplified form. These concepts are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

Preferred embodiments of the present invention are described in detail below with reference to the attached drawing figures, wherein:

FIG. 6 is an enlarged, outer perspective view of a magnet of the rotor of FIGS. 1-5;

FIG. 7 is an inner perspective view of the magnet of FIG. 6; and

Figure 1:
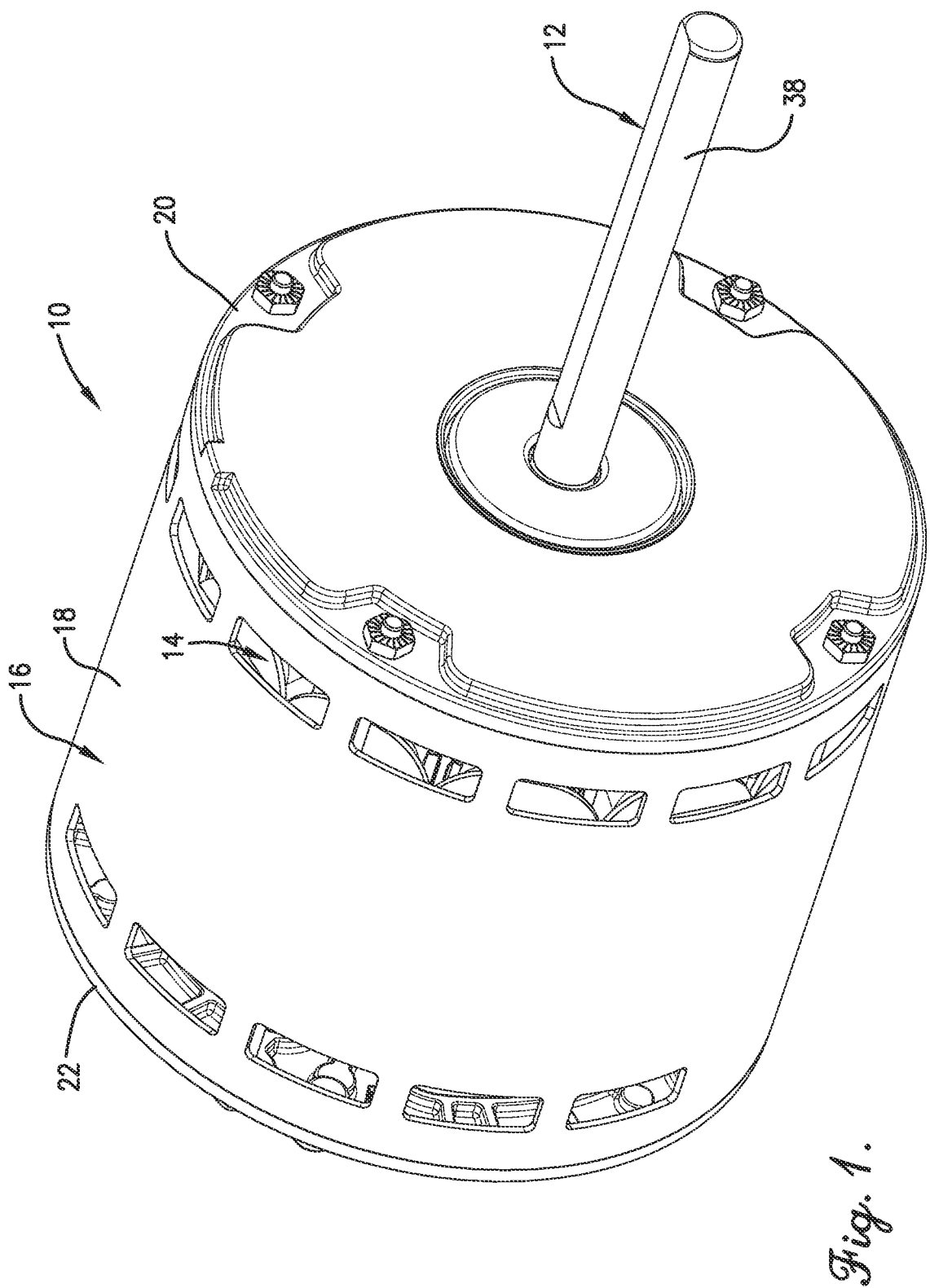
FIG. 1 is a front perspective view of a motor in accordance with a first preferred embodiment of the present invention.

The drawing figures do not limit the present invention to the specific embodiments disclosed and described herein.

While the drawings do not necessarily provide exact dimensions or tolerances for the illustrated structures or components, the drawings are to scale with respect to the relationships between the components of the structures illustrated in the drawings.

DETAILED DESCRIPTION

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

Furthermore, unless specified or made clear, the directional references made herein with regard to the present invention and/or associated components (e.g., top, bottom, upper, lower, inner, outer, etc.) are used solely for the sake of convenience and should be understood only in relation to each other. For instance, a component might in practice be oriented such that faces referred to as "top" and "bottom" are sideways, angled, inverted, etc. relative to the chosen frame of reference.

Figure 2:
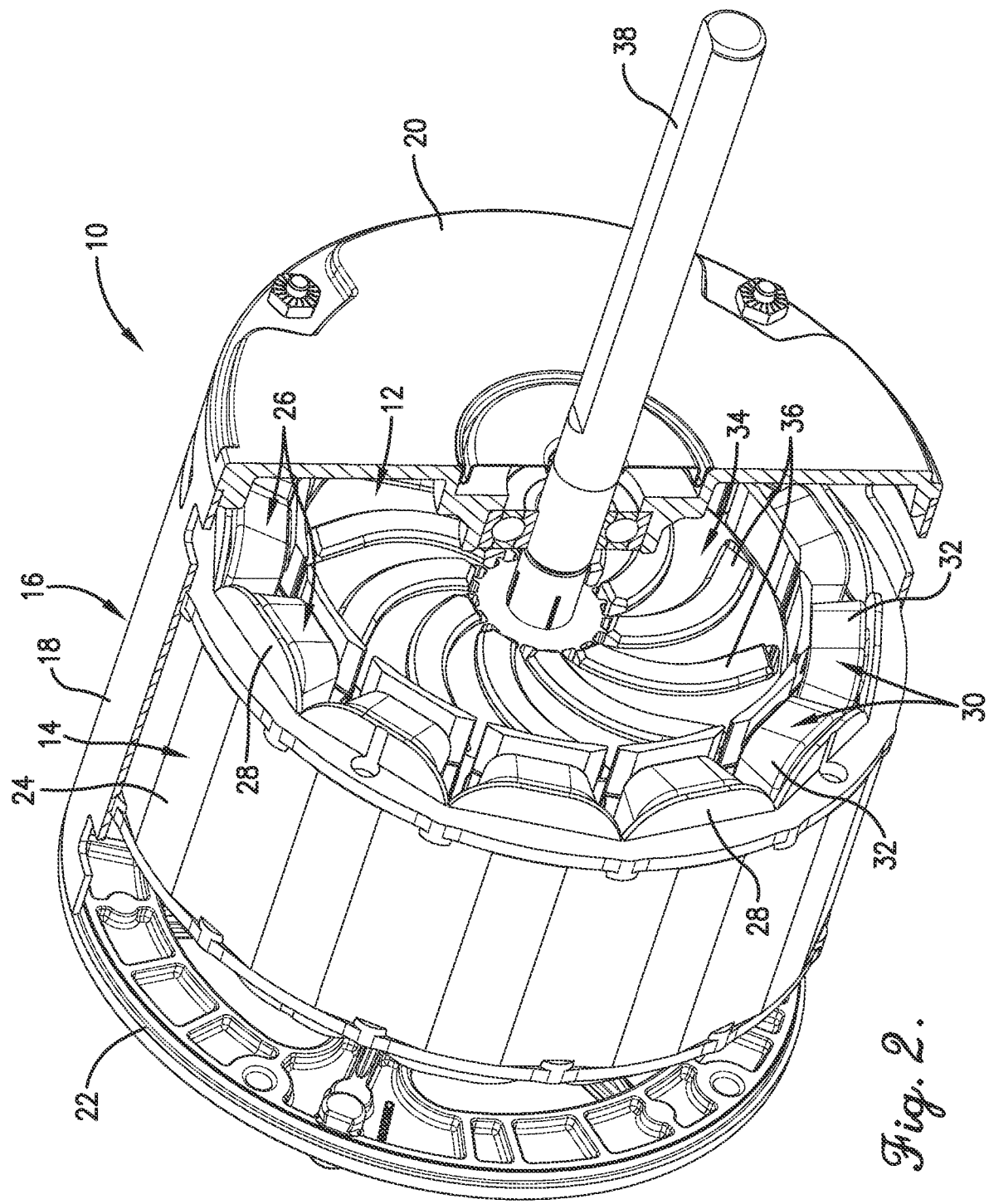
FIG. 2 is a partially sectioned perspective view of the motor of FIG. 1.
Figure 3:
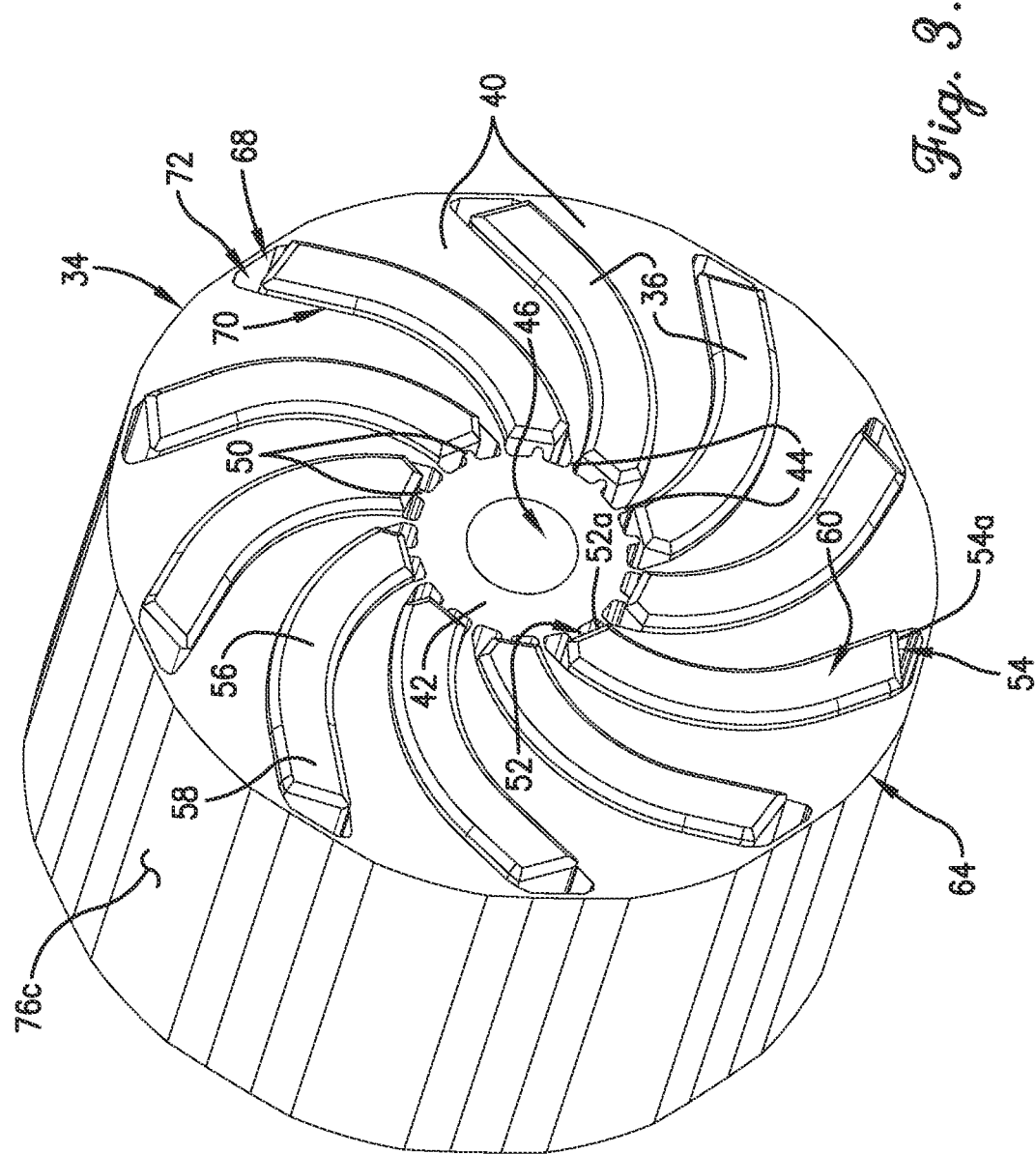
FIG. 3 is a front perspective view of the rotor core and magnets of the motor of FIGS. 1 and 2.
Figure 4:
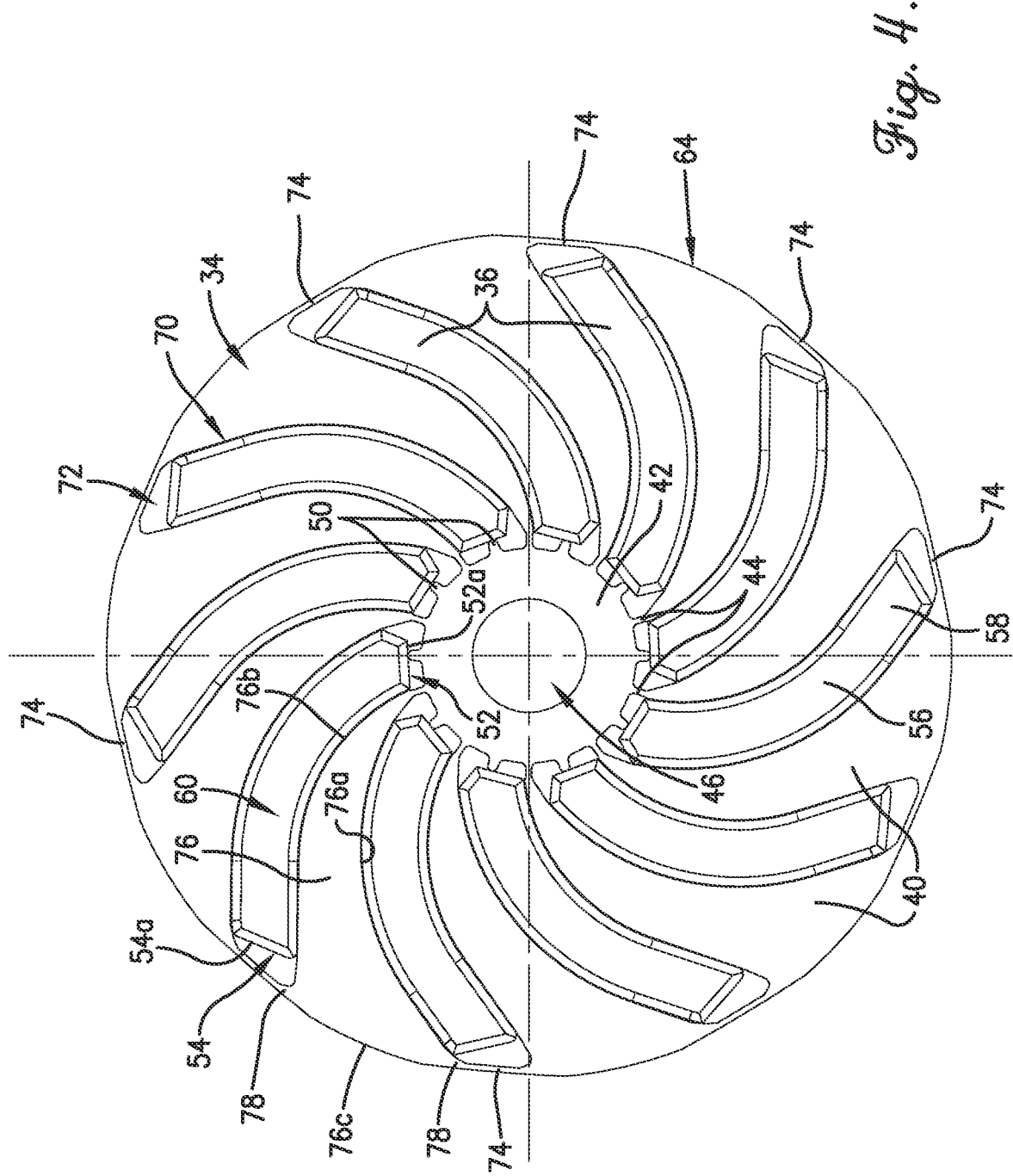
FIG. 4 is a front view of the rotor core and magnets of FIG. 3.

With initial reference to FIGS. 1 and 2, an electric motor 10 is provided. The motor 10 includes a rotor 12 rotatable about an axis. The motor 10 further includes a stator 14. The stator 14 preferably at least substantially circumscribes the rotor 12 such that the motor 10 is an inner rotor motor. However, at least some of the inventive features described herein are equally applicable to outer rotor motors and/or dual rotor motors.

The motor 10 further preferably includes a housing 16 including a cylindrical shell 18 extending between and interconnecting a pair of axially opposed endshields 20 and 22.

The stator 14 preferably includes a stator core 24 and a plurality of coil assemblies 26 mounted to the stator core 24. Each coil assembly 26 preferably includes a bobbin 28 and a plurality of coils 30. The coils 30 comprise electrically conductive wiring 32 wound about the respective bobbins 28.

Although the stator 14 is provided with bobbins 28, the stator may be insulated in any manner known in the art without departing from the scope of the present invention. For instance, the stator might be provided with full length endcaps, overmolding, or insulative inserts or wraps (e.g., Mylar papers).

Furthermore, although the illustrated stator 14 is formed from punched linear bar laminations that are thereafter formed into curves, the stator might be alternatively formed without departing from the scope of the present invention. For instance, the stator might be a full round stator (i.e., comprising laminations punched in a full circle), be solidly constructed, be arcuately segmented, etc.

The rotor 12 preferably includes a rotor core 34, a plurality of magnets 36, and a shaft 38 defining a rotational axis for the rotor 12. The rotor core 34 includes a plurality of pole segments 40 arranged arcuately about the axis. The magnets 36 are arranged arcuately so as to alternate arcuately with the pole segments 40. Each of the magnets 36 is thus at least in part interposed between a pair of adjacent pole segments 40.

The rotor core 34 preferably comprises steel, although other materials may alternatively be used without departing from the scope of the present invention. The magnets 36 are preferably permanent magnets comprising ferrite, although other suitable magnet materials, such as neodymium, may be used according to certain aspects of the present invention.

The rotor core 34 further preferably includes a hub 42 and a plurality of bridges 44 extending between and interconnecting respective ones of the pole segments 40 to the hub 42. The shaft 38 preferably extends through an opening 46 defined by the hub.

Preferably, as illustrated, the hub 42 is at least substantially toroidal in form to present inner and outer cylindrical faces centered about the rotor axis. The hub might be alternatively configured without departing from some aspects of the present invention, however. For instance, the hub might alternatively present a faceted or polygonal outer surface comprising a plurality of flat faces, or the inner opening defined by the hub might be non-circular in keeping with an alternative shaft formation.

In a preferred embodiment, each of the bridges 44 connects with a corresponding one of the pole segments 40. Furthermore, each pole segment 40 is connected to the hub 42 via a corresponding bridge 44. That is, the number of pole segments 40 is preferably equal to the number of bridges 44. It is permissible according to some aspects of the present invention, however, for the rotor core to include differing numbers of bridges and pole segments.

In the illustrated embodiment, each bridge 44 is at least substantially rectangular in form and extends radially outward from the hub 42, although alternate shapes and/or directions of extension for some or all of the bridges are permissible according to some aspects of the present invention.

Preferably, each bridge 44 engages a corresponding one of the pole segments 40 at tangential or arcuate bridge interface 48. The bridge interface 48 has a generally tangential or arcuate center point 48a.

The center points 48a may alternatively be characterized in relation to the pole segments 40 themselves, rather than in relation to the bridge interfaces 48. More particularly, each pole segment 40 may be understood to present a radially inner end 48 (which coincides with the respective bridge interface 48 in the illustrated embodiment). Each radially inner end 48 preferably has a generally tangential or arcuate center point 48a.

The rotor core 34 further preferably includes a plurality of nubs 50 extending radially outward from the hub 42. The nubs 50 preferably alternate arcuately with the bridges 44, with even spacing being provided from each bridge 44 to adjacent ones of the nubs 50 and vice versa. Each nub 50 preferably engages a corresponding one of the magnets 36 to restrict shifting thereof in a radially inward direction.

The nubs 50 each preferably include a rounded radially outer end, although alternative geometries are permissible. Furthermore, the nubs might be omitted in lieu of alternative magnet retention means such as overmolding, other structural components, etc. Such retention means might also be provided in addition to nubs.

Although the rotor core 34 of the present invention is preferably formed of axially stacked punched laminations (each of which includes at least pole segment, hub, bridge, and nub components), it is permissible for alternative manufacturing and/or assembly techniques to be utilized. For instance, fully formed pole segments might be press-fit into the hub using a dovetail joint or other suitable connection. (In such an instance, the hub is preferably but not necessarily formed of a different material than the pole segments.) In another alternative, pole segments might be molded into position in such a manner that "direct" connections between the pole segments and the hub, whether via bridges, jointing, or another technique, are not present. Molding might also be provided supplementarily to another connection or positioning technique. Still further, varying lamination designs might be provided, perhaps in an axially alternating or staggered manner, or a single lamination design might be provided but with axially adjacent ones or sets of laminations angularly rotated or clocked relative to one another. In summary, provided operability of the motor in a broad sense is maintained, it is permissible for varying or alternative bridge types or pole segment-to-hub connection configurations to be provided, for bridges or direct connections to be omitted entirely, and/or for other variations in rotor core design to occur without departing from the scope of some aspects of the present invention.

In a broad sense, each magnet 36 preferably defines a radially inner end 52 and a radially outer end 54. Furthermore, in the embodiment of FIGS. 1-8, each magnet 36 includes both a curved section 56 and a straight section 58. The curved section 56 preferably extends arcuately from the radially inner end 52 to a radially outer curved section end 60 disposed intermediately between the inner and outer ends 52 and 54. The straight section 58 preferably extends straight and, most preferably non-radially, from the outer curved section end 60 to the radially outer end 54 of the magnet 36. (As will be discussed below with respect to the second and third embodiments of the present invention, it is permissible according to some aspects of the present invention for the straight section to be omitted entirely.)

In the illustrated embodiment, the radially inner end 52 presents a radially inner end face 52a of the magnet 36. Similarly, the radially outer end 54 presents a radially outer end face 54a of the magnet 36.

Furthermore, in a preferred embodiment, the curved section end 60 can alternatively be characterized with reference to the magnet 36 as a whole as presenting a transition interface 60a between the curved and straight sections 56 and 58. That is, the transition interface 60a is preferably disposed intermediately between the inner and outer ends 52 and 54 of the magnet, where the curved and straight sections 56 and 58 abut each other.

The curved and straight sections 56 and 58, respectively, are preferably continuously formed with one another such that each magnet 36 comprises a unitary body. However, it is permissible according to some aspects of the present invention for the sections to be separate or discrete pieces.

The curved section 56 preferably presents a front curved face 56a, a back curved face 56b, and opposite axially extending inner and outer curved faces 56a and 56b extending between and interconnecting the front curved face 56a and the back curved face 56b. The inner and outer curved faces 56c and 56d each also preferably extend continuously (i.e., without gaps, obstructions, or other irregularities) between the radially inner end 52 and the outer curved section end 60.

The inner curved face 56c preferably faces generally radially inward. The outer curved face 56d preferably faces generally radially outward.

Most preferably, the inner curved face 56c has a constant curvature or, alternatively stated, presents a constant radius of curvature R1 so as to extend along a circular arc. Likewise, the outer curved face 56d preferably has a constant curvature or, alternatively stated, presents a constant radius of curvature R2 so as to extend along a circular arc.

In a preferred embodiment, the inner and outer curved faces 56c and 56d are centered on a common center of curvature C. That is, the hypothetical circles along which the inner and outer curved faces 56c and 56d extend are concentric.

Thus, it will also be understood by those of ordinary skill in the art that the curved section 56 preferably presents a constant width W1 between the inner and outer curved faces 56c and 56d.

Although concentric, constant-radius extension of both the inner and outer curved faces 56c and 56d is preferred, it is permissible according to some aspects of the present invention for variations to occur. For instance, the curved section might alternatively include multiple portions each having distinct geometries (e.g., varying radii of curvature, centers of curvature, etc.). Such variations might apply similarly to both the inner and outer curved faces, or the variations might be irregularly applied such that the width of the curved section varies along its length.

In both the illustrated preferred embodiment of FIGS. 1-8 and in the above-described alternative magnet configurations, despite potential variations in radii of curvature, centers of curvature, and so on, the curved sections of the magnets preferably remain in a general sense continuously curved (i.e., smoothly curved). That is, vertices are not present. However, it is also permissible according to some aspects of the present invention for the curved section to comprise a plurality of straight sections positioned relative to one another in such a manner that a curve is broadly formed thereby. That is, each of the inner and outer curved faces might be understood to be faceted yet still curved in a general sense.

It is noted that the transition at the transition interface 60a is likewise preferably generally smooth and devoid of sharp angles or vertices.

In a preferred embodiment, the radius of curvature R1 of the inner curved face 56c is between about five tenths (0.5) inches and about one and twenty-five hundredths (1.25) inches. Most preferably, the radius of curvature R1 of the inner curved face 56c is about eight hundred thirty six thousandths (0.836) inches.

The radius of curvature R2 of the outer curved face 56d is preferably between about seventy-five hundredths (0.75) inches and about one and five tenths (1.5) inches. Most preferably, the radius of curvature R2 of the outer curved face 56d is about one and one hundred twenty-three thousandths (1.123) inches.

Preferably, the width W1 of the curved section 56 is between about fifteen hundredths (0.15) inches and about one (1) inch. Most preferably, the width W of the curved section 56 is about two hundred eighty-seven thousandths (0.287) inches.

Figure 8:
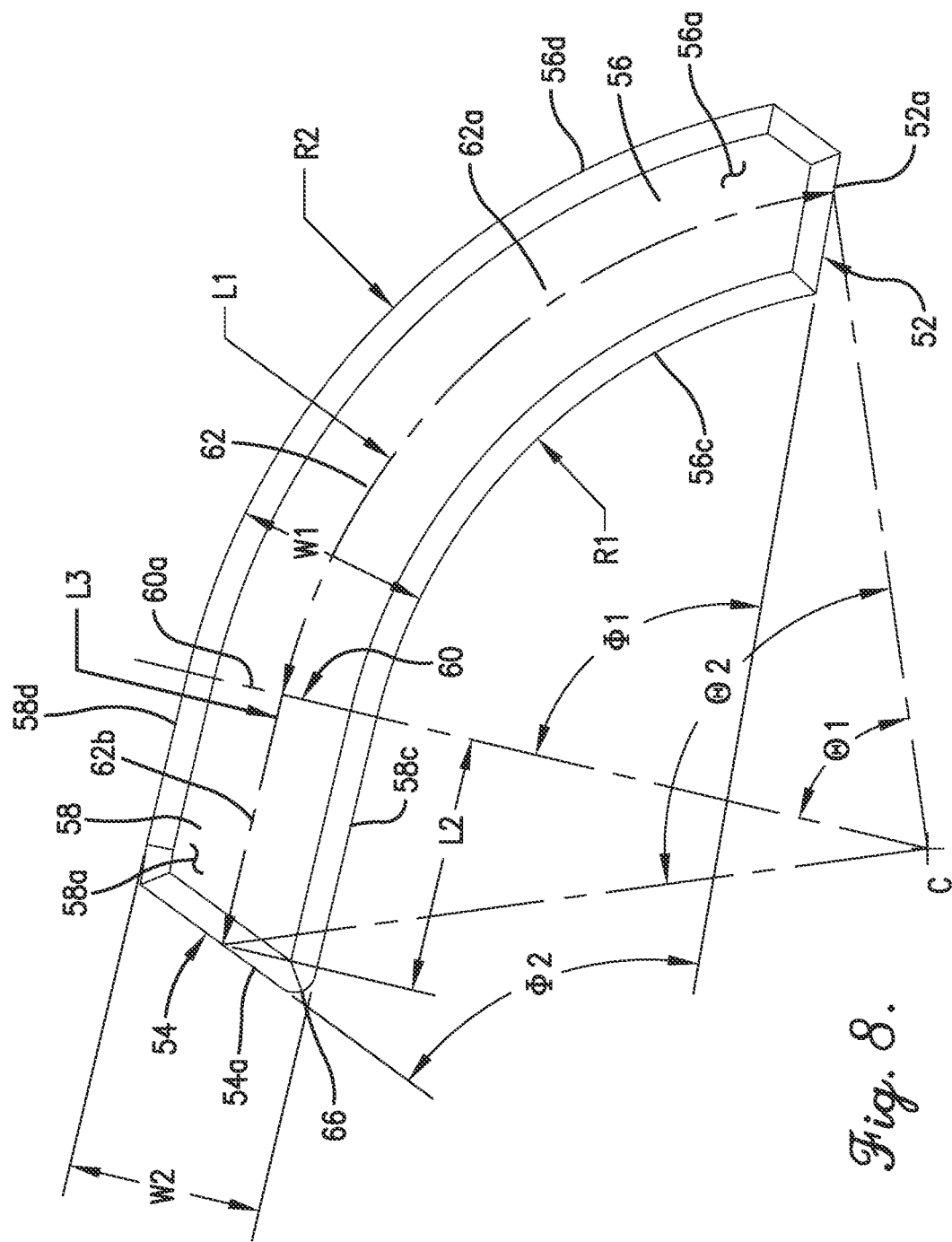
FIG. 8 is a front view of the magnet of FIGS. 6 and 7, particularly illustrating the relative proportions and general geometries of the curved and straight portions thereof.

As shown in FIG. 8, a hypothetical magnet centerline 62 comprising a curved section centerline 62a and a straight section centerline 62b preferably extends through the magnet 36. More particularly, the curved section centerline 62a preferably extends arcuately through the curved section 56 from the radially inner end 52 of the magnet 36 to the radially outer curved section end or transition interface 60 so as to be equally spaced from each of the inner and outer curved faces 56c and 56d. That is, the curved section 56 preferably extends along the curved section centerline 62a.

Furthermore, the curved section 56 preferably has a curved section length L1 along the curved section centerline 62a. The preferred curved section length L1 is between about five tenths (0.5) inches and about one and five tenths (1.5) inches. Most preferably, the curved section length L1 is about one and one thousand, six hundred ninety-eight ten thousandths (1.1698) inches.

Alternatively characterized, the curved section 56 preferably extends along the curved section centerline 62a for an angular arc length θ1 of between about forty-five (45) degrees and about ninety-five (95) degrees. More preferably, the curved section 56 has an arc length θ1 along the curved section centerline 62a of between about sixty (60) degrees and about eighty (80) degrees. Most preferably, the arc length θ1 of the curved section 56 along the curved section centerline 62a is about sixty eight (68) degrees.

The end face 52a and the transition interface 60a are preferably angled relative to each other by an angle φ1 of between about seventy (70) degrees and about one hundred ten (110) degrees. More preferably, φ1 is between about eighty (80) degrees and about one hundred (100) degrees. Most preferably, the angle φ1 of the face 52 relative to the interface 60 is about eighty-seven (87) degrees.

As noted previously, the straight section 58 of each magnet 36 preferably extends straight and, most preferably non-radially, from the outer curved section end 60 to the radially outer end 54 of the magnet 36. More particularly, each straight section 58 preferably presents a front straight face 58a, a back straight face 58b, and opposite axially extending inner and outer straight faces 58c and 58d extending between and interconnecting the front straight face 58a and the back straight face 58b. The inner and outer straight faces 58c and 58d each also preferably extend continuously (i.e., without gaps, obstructions, or other irregularities) between the transition interface 60 and the radially outer end 54 of the magnet 36.

The inner straight face 58c preferably faces generally radially inward. The outer straight face 58d preferably faces generally radially outward.

The inner straight face 58c preferably extends tangentially from the inner curved face 56c at the transition interface 60. Similarly, the outer straight face 58d preferably extends tangentially from the outer curved face 56d at the transition interface 60.

The straight section 58 preferably presents a constant width W2 between the inner and outer straight faces 58c and 58d. (Alternatively stated, the inner and outer straight faces 58c and 58d are preferably parallel to one another.) The width W2 of the straight section 58 is most preferably equal to the width W1 of the curved section 56. It is permissible according to some aspects of the present invention for the straight section to instead be variable in width (e.g., tapered or flared), to extend non-tangentially from the curved section, to present a different width than that of the curved section (or a portion thereof), etc.

Preferably, the width W2 of the straight section 58 is between about fifteen hundredths (0.15) inches and about one (1) inch. Most preferably, the width W2 of the straight section 58 is about two hundred eighty-seven thousandths (0.287) inches.

The aforementioned hypothetical straight section centerline 62b (see FIG. 8) preferably extends linearly through the straight section 58 from the transition interface 60 to the radially outer end 54 of the magnet 36 so as to be equally spaced from each of the inner and outer curved straight faces 58c and 58d. That is, the straight section 58 preferably extends along the straight section centerline 62b.

As will be apparent from the above descriptions, the curved section centerline 62a preferably interconnects smoothly with the straight section centerline 62b. That is, the centerlines 62a and 62b (and, in turn, the curved and straight sections 56 and 58) are not offset or angled relative to one another.

The straight section 58 preferably has a straight section length L2 along the straight section centerline 62b. Preferably, the straight section length L2 is between about twenty-five hundredths (0.25) inches and about seventy-five hundredths (0.75) inches. Most preferably, the straight section length L2 is about three thousand, eight hundred one ten thousandths (0.3801) inches.

Each magnet 36 preferably has a total length L3 equal to the sum of the curved section length L1 and the straight section length L2. The curved section length L1 is preferably at least fifty percent (50%) of the total length L3, more preferably between about sixty percent (60%) and about ninety percent (90%) of the total length L3, and most preferably about seventy-five and forty-eight hundredths percent (75.48%) of the total length L3.

Again, as noted previously, it is permissible according to some aspects of the present invention for the straight section to be omitted entirely. Although two (2) such embodiments are described in detail below, it is noted here that in such an instance, the curved section length L1 would be equal to the total length L3. Thus, with such an embodiment in mind, the curved section length L1 might alternatively be described as most preferably being between about sixty percent (60%) and about one hundred percent (100%) of the total length L3, and most preferably one hundred percent (100%) of the total length L3.

Nominally, as will be apparent from the above described preferred lengths L1 and L2 of the curved and straight sections 56 and 58, respectively, the total magnet length L3 is preferably between about seventy-five hundredths (0.75) inches and about two and twenty-five hundredths (2.25) inches. Most preferably, the total magnet length L3 is about one and five thousand, four hundred ninety-nine ten thousandths (1.5499) inches.

Figure 5:
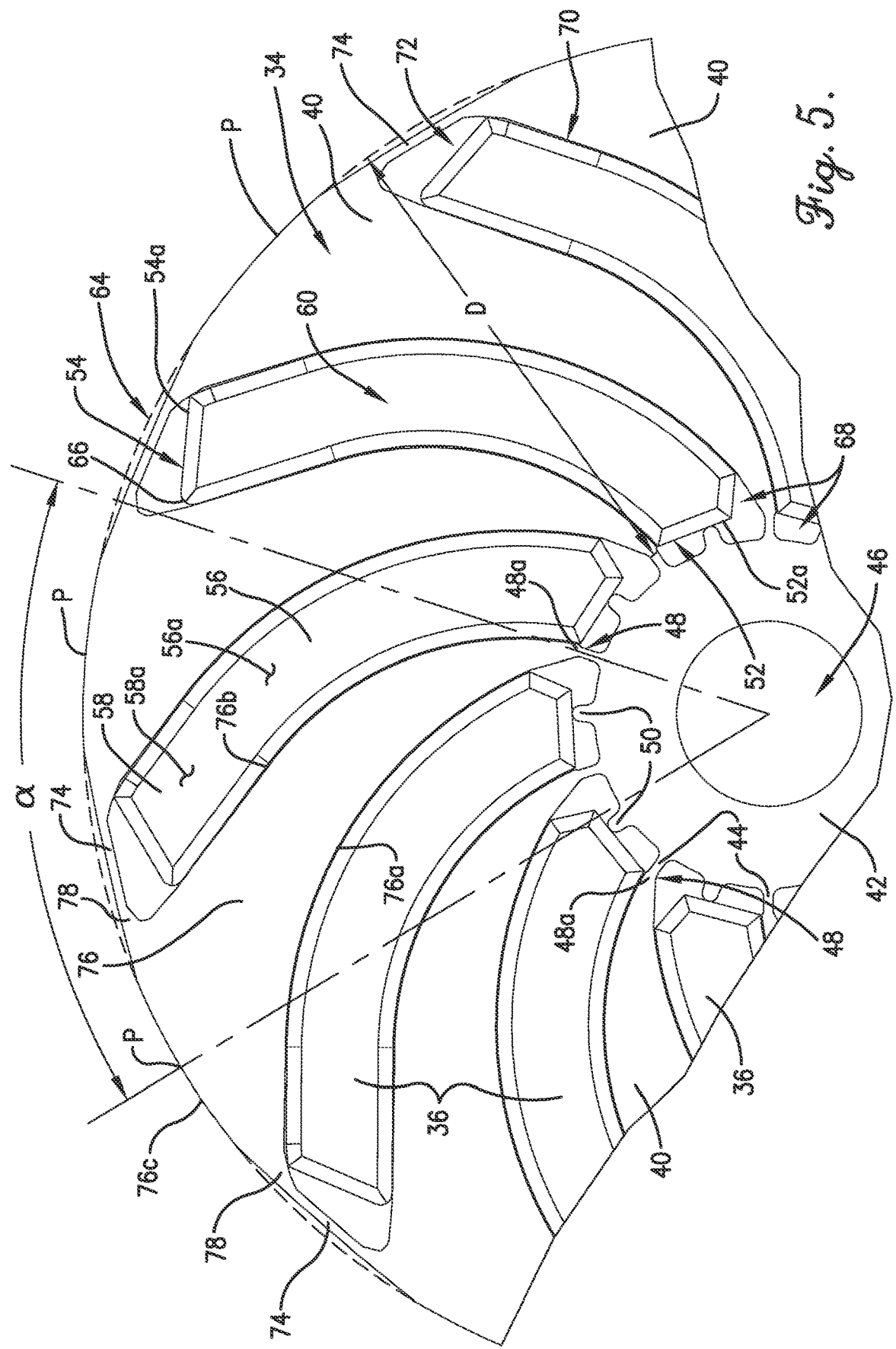
FIG. 5 is an enlarged front view of a portion of the rotor core and magnets as shown in FIG. 4, particularly illustrating the skew of the effective rotor pole locations relative to the corresponding pole segment bridges.

As shown in FIG. 5, a radial distance D may be defined from each bridge interface 48 to a radially outermost circumferential margin 64 of the rotor core 34. In a preferred embodiment, the distance D is between about (0.75) inches and (1.75) inches. More preferably, the distance D is between about one (1) inch and about one and five tenths (1.5) inches. Most preferably, the distance D is about one and three thousand, one hundred ninety-eight ten thousandths (1.3198) inches.

Due to provision of the curved section 56 and the non-radial orientation of the straight section 58, the total magnet lengths L3 are preferably significantly greater than the radial distances D. For instance, it is preferred that each total magnet length L3 is at least five percent (5%), more preferably at least ten percent (10%), and most preferably at least fifteen percent (15%) greater than corresponding ones of the radial distances D. In the illustrated embodiment, for instance, each total magnet length L3 is about seventeen and forty-three hundredths percent (17.43%) greater than the radial distance D.

In a practical sense, the increased relative length facilitates a greater magnet pole face area for each magnet 36 compared to that conventionally achieved in the same motor envelope. In turn, an increased magnet pole face area facilitates improved flux concentration. For instance, in comparison to a conventional spoked rotor, the present invention preferably achieves at least a ten percent (10%) increase, more preferably at least a twenty-five percent (25%) increase, and most preferably a greater than thirty percent (30%) increase in magnet pole face area.

As will be apparent to those of ordinary skill in the art, the magnet pole face area in the preferred, illustrated embodiment can be understood to be the combined area of the inner and outer faces 56c and 56d of the curved section 56 and the inner and outer faces 58c and 58d of the straight section 58. (As will be discussed in greater detail below, these faces 56c, 56d, 58c, and 58d are tangential to the local magnetizing direction.)

Each magnet 36 also preferably has a total arcuate span θ2 along the centerline 62 from the radially inner end 52 to the radially outer end 54, and measured relative to the center of curvature C, of between about seventy (70) degrees and about one hundred ten (110) degrees, more preferably between about eighty (80) degrees and about one hundred (100) degrees, and most preferably of about ninety (90) degrees.

The end faces 52a and 54a of each magnet 36 are preferably angled relative to each other by an angle φ2 of between about forty (40) degrees and about ninety (90) degrees. More preferably, φ2 is between about fifty (50) degrees and about eighty (80) degrees. Most preferably, the angle φ2 of the face 52a relative to the face 54a is about sixty-four (64) degrees.

In a preferred embodiment, the straight section 58 presents non-rectangular front and back straight faces 58a and 58b. More particularly, the inner straight section face 58c is preferably longer than the outer straight section face 58d, such that the front and back straight faces 58a and 58b are generally trapezoidal. Still more particularly, the front and back straight faces 58a and 58b are preferably at least substantially right trapezoidal such that the magnet 36 defines an acute apex 66 at the outer end 54 and adjacent the inner straight section face 58c.

In the illustrated embodiment, various surfaces of the magnets 36 are chamfered. However, it is permissible according to some aspects of the present invention for some or all of the illustrated chamfers to be omitted, for some or all of the chamfers to be replaced with rounds or other transitions, etc.

Preferably, each pair of adjacent pole segments 40 defines a slot 68 therebetween. Each slot 68 includes a magnet-receiving portion 70 and a gap portion 72. The magnets 36 are each at least in part received in the magnet-receiving portion 70 of a corresponding one of the slots 68, with the corresponding gap portion 72 being devoid of the corresponding magnet 36.

As noted previously, the rotor core 34 preferably presents a circumferential radially outermost margin 64. The slots 68 each preferably extend to the radially outermost margin 64 of the rotor core 34 except for the presence of a corresponding plurality of tangential (or, alternatively, arcuate) connectors 74 extending between and interconnecting adjacent ones of the pole segments 40. The previously described shape of the magnets 36 is such that the gap portion 72 is defined between each radially outer magnet end 54 and the corresponding connector 74.

Figure 9:
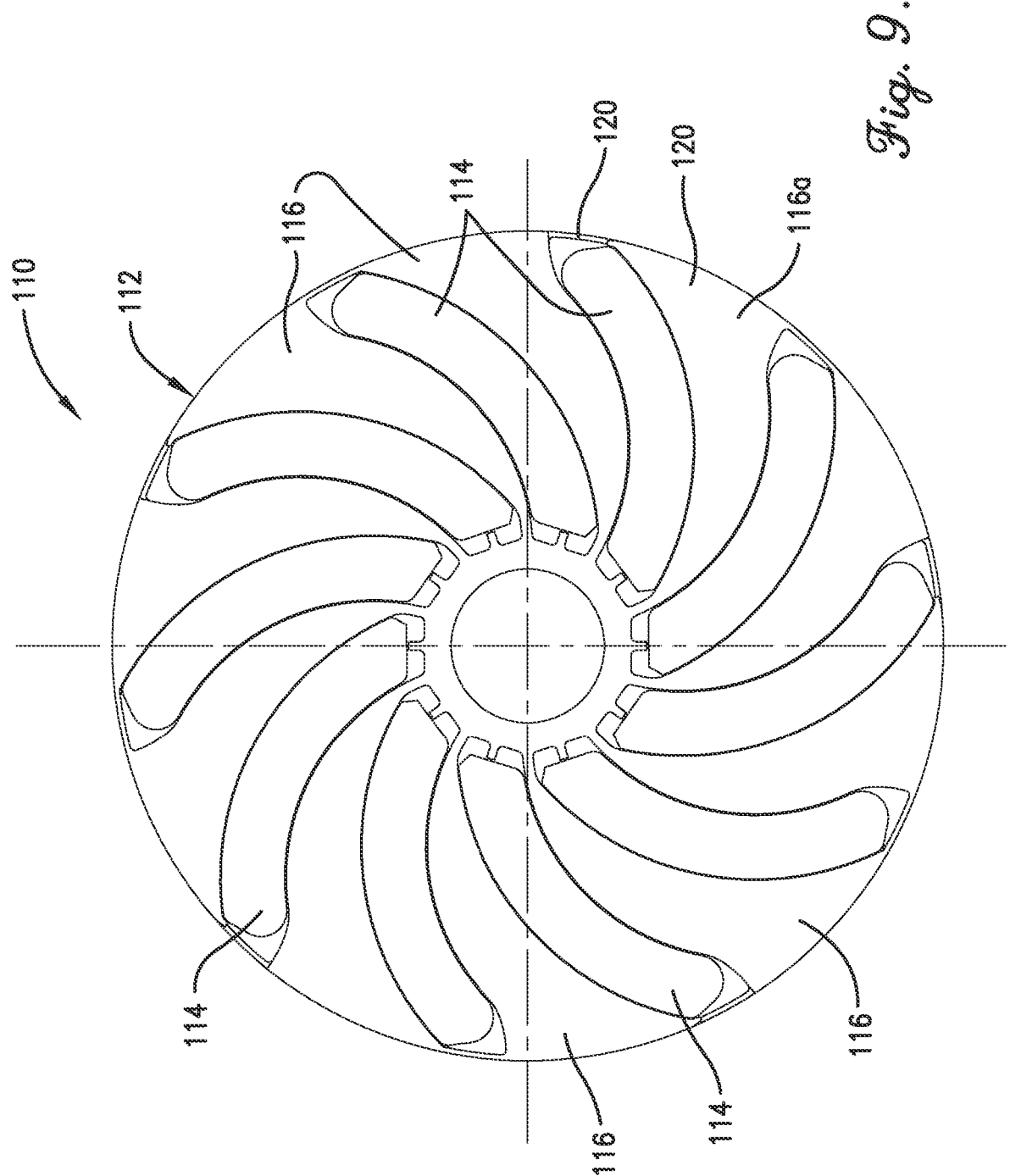
FIG. 9 is a front view of a rotor core and magnets in accordance with a second preferred embodiment of the present invention.
Figure 10:
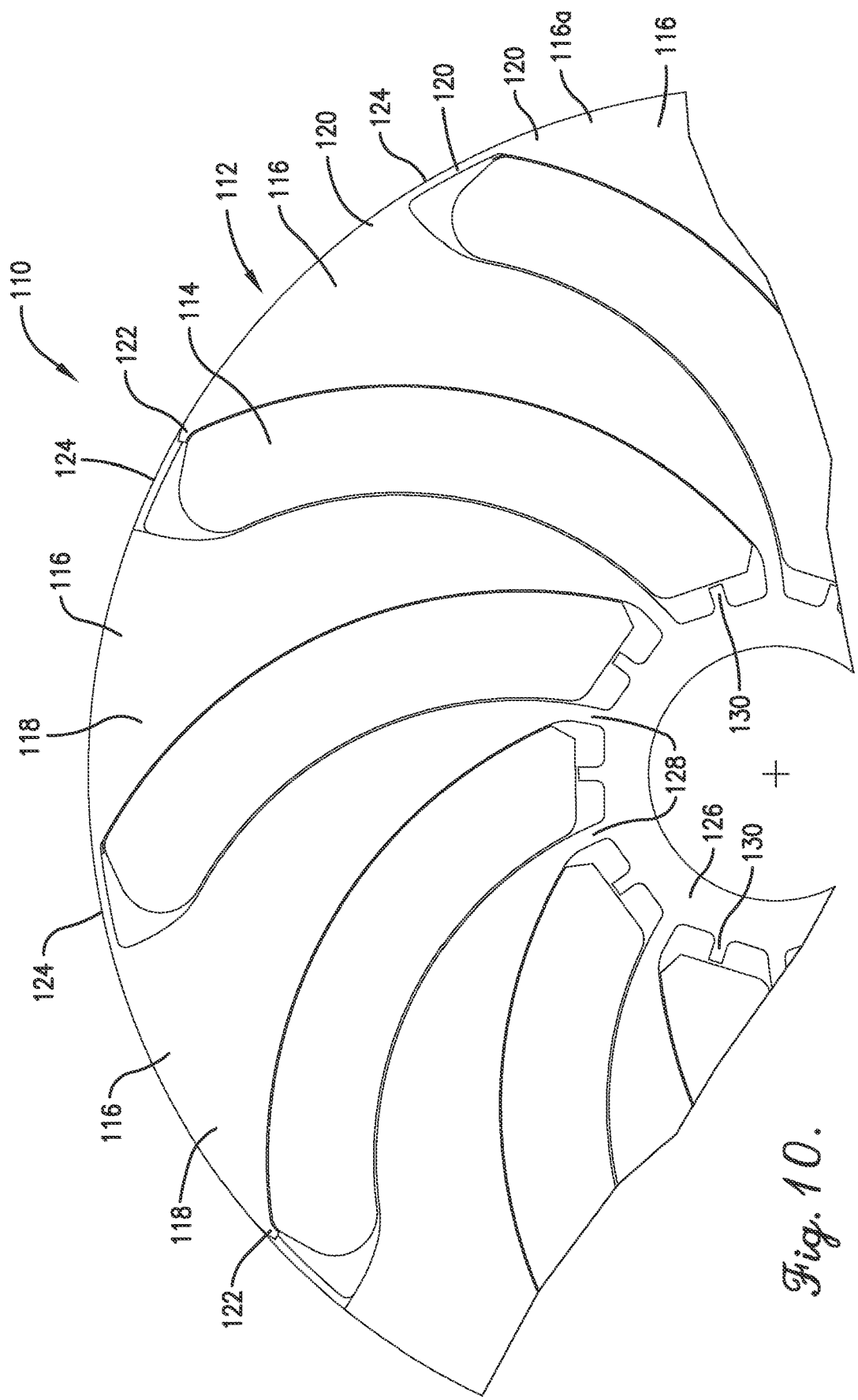
FIG. 10 is an enlarged front view of a portion of the rotor core and magnets of FIG. 9.
Figure 11:
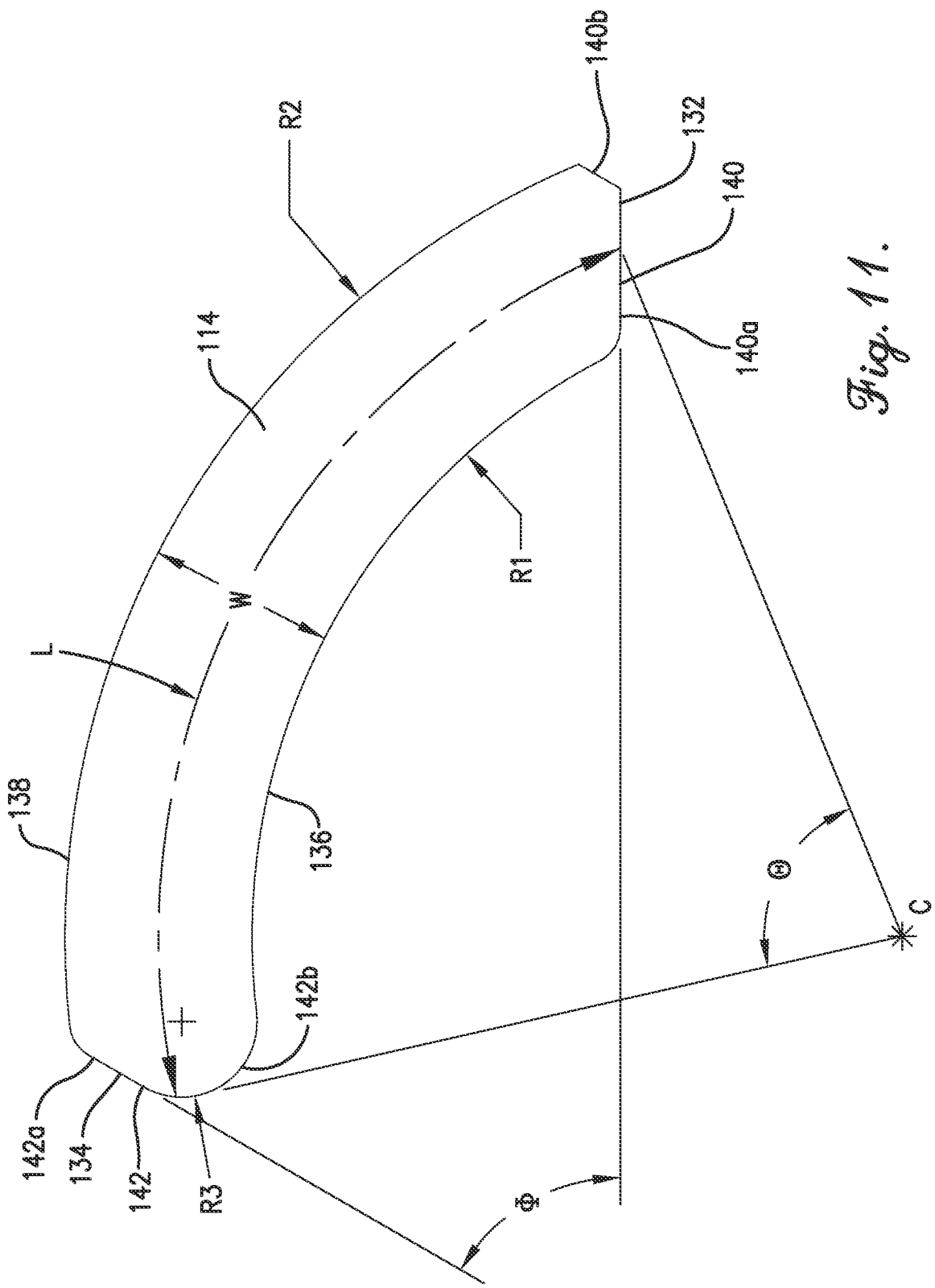
FIG. 11 is a front view of one of the magnets of FIGS. 9 and 10, particularly illustrating the proportions and general geometry thereof.

In the illustrated embodiment of FIGS. 1-8, connectors 74 are provided between each pair of adjacent pole segments 40. However, it is permissible according to some aspects of the present invention for connectors to be omitted entirely or provided only between a subset of the pole segments. Such subset may include multiple pairs of pole segments (and thus multiple connectors) or even only a single pair of pole segments (and thus only a single connector). The second preferred embodiment of the present invention, as illustrated in FIGS. 9-11 and discussed in greater detail below, features such a subset-based design.

The geometry of the slots 68 and the magnets 36 (including the straight sections 58 thereof) is such that the gap portions 72 are preferably generally triangular in form. Most preferably, the gap portions 72 are generally right triangular in form. However, alternative gap portion shapes are permissible according to some aspects of the present invention.

The gap portions 72 may be naturally or environmentally filled (i.e., with ambient air), be filled with a non-magnetically conductive material (e.g., an epoxy), etc. without departing from the scope of the present invention. It is also permissible according to some aspects of the present invention for the magnets and slots to be configured in such a manner that the magnets fill the slots entirely. The gap portions in such an embodiment would therefore be omitted.

It is noted that filling of the gap portions with a structural material (e.g., an epoxy, etc. as noted above) may be particularly advantageous in embodiments in which some or all of the connectors have been omitted.

The magnets 36 are each preferably magnetized at least substantially radially. That is, the direction of magnetization is radially from the inner curved face 56c to the outer curved face 56d and orthogonally or straight from the inner straight face 58c to the outer straight face 58d. Thus, each magnet 36 has a first polarity along its inner curved and straight faces 56c and 58c and a second, opposite polarity along its outer curved and straight faces 56d and 58d.

Minor deviations from such magnetization (e.g., parallel magnetization within the curved section, radial magnetization within the straight section, circumferential or circular magnetization, etc.) are permissible according to some aspects of the present invention, although performance outcomes may suffer.

The directionality or polarity of the magnets 36 preferably alternates arcuately. That is, outer faces 56d and 58d presenting a north polarity will be opposed to inner faces 56c and 58e of a different magnet 36 also presenting a north polarity, and so on, with corresponding "like-polarity" faces being separated from one another by one of the pole segments 40.

Alternatively stated, a magnet 36 for which the outer faces 56d and 58d present a first polarity (e.g., a north polarity) will be disposed arcuately between a pair of magnets 36 for which the outer faces 56d and 58d present a second, opposite polarity (e.g., a south polarity). (Pole segments 40 will, of course, be interposed between the magnets 36 as described above.)

Each pole segment 40 includes a generally radially extending body 76 and a pair of circumferentially extending ears 78 projecting outward from the body 76. The body 76 connects to a corresponding one of the bridges 44 at the corresponding bridge interface 48. The ears 78 each are connected to corresponding ears 78 of adjacent ones of the pole segments 40 by corresponding ones of the connectors 74.

It is also permissible according to some aspects of the present invention for some or all of the ears to be omitted and/or for some of all of the connectors to be omitted. (In embodiments in which ears are omitted, connectors may be provided directly between adjacent pole segment bodies.)

Each body 76 is preferably generally shaped in a curved or "swept" triangular manner. More particularly, each body 76 includes a curved inner body face 76a that abuts the outer curved face of an adjacent magnet 36 and a curved outer body face 76b that abuts the inner curved face 56c of another adjacent magnet 36. This geometry in turn dictates a general arcuate widening or flaring of each pole segment 40 as it expands radially outwardly.

Although it is preferred that the rotor core 34 include solid pole segment bodies 76 disposed between adjacent magnets 36, as described above, it is noted that alternative rotor core designs that omit such pole bodies fall within the scope of some aspects of the present invention. Among other things, for instance, the core or a comparable component might alternatively be at least in part in the form of a latticed, spoked, or cylindrical framework supporting the magnets. That is, use of curved magnets as described above in broadly differing rotor (or rotor core) designs is permissible according to some aspects of the present invention.

Each pole segment body 76 (or, more broadly, each pole segment 40) includes a radially outer face 76c that at least in part defines the previously mentioned radially outermost margin 64 of the rotor core 34. In a preferred embodiment, as a result of the above-described magnet and pole segment designs, an effective rotor pole location P is defined on each of the pole segments 40, centered arcuately along the radially outer face 76c of the corresponding pole segment 40.

As noted previously, each bridge interface 48 or, alternatively, inner end 48 of a pole segment 40, has a center point 48a. For each pole segment 40, the effective rotor pole location P is arcuately offset from (i.e., skewed from) the center point 48a by a skew angle $\alpha$. That is, in contrast to a conventional spoked rotor, the effective rotor pole locations P are not disposed directly radially outward of the associated bridges or, alternatively stated, the centers of the inner ends of the pole segments.

Preferably, each rotor pole location P is arcuately offset from the corresponding one of the center points 48a by a skew angle $\alpha$ between about five tenths (0.5) rotor poles and about two (2.0) rotor poles. More preferably, the skew angle $\alpha$ is between about one and twenty-five hundredths (1.25) rotor poles and about one and five tenths (1.5) rotor poles. Most preferably, the rotor pole locations P are arcuately offset from the corresponding center points 48a by a skew angle $\alpha$ of about one and thirty-seven hundredths (1.37) poles.

In a preferred embodiment, the motor 10 is a ten (10) pole motor 10. Thus, as will be understood by those of ordinary skill in the art, the rotor pole locations P might alternatively be understood to most preferably be arcuately offset from the corresponding ones of center points 48a by a skew angle $\alpha$ of about forty-nine and two tenths (49.2) degrees.

As will be apparent from the above, it is preferred that the rotor pole locations P are disposed radially outward from the center points 48a. More particularly, the rotor pole locations P are preferably disposed at radially outer ends (and, more specifically at the radially outer faces 76c) of the pole segments 40. The center points 48a are disposed opposite the rotor pole locations P and, more specifically, at the radially inner ends 48 of the pole segments 40. It is permissible according to some aspects of the present invention, however, for the rotor pole locations to instead be radially inward of the center points (e.g., as in an outer rotor motor) or to be otherwise positioned relative thereto and/or relative to the respective pole segment bodies in a broad sense.

The above-described design is highly advantageous, achieving significant flux concentration without increasing the motor envelope (e.g., via a greater stack height), requiring the use of upgraded materials (e.g., neodymium magnets, aluminum stator wiring, etc.), and/or utilizing added active materials (e.g., copper, steel, etc.). For instance, in comparison to an otherwise similarly configured and sized conventional spoked rotor motor, and in addition to the previously described performance characteristics, the motor 10 of the illustrated embodiment enables improved stator tooth flux density (e.g., at least a ten percent (10%) increase and most preferably a fifteen percent (15%) increase or greater). The motor 10 also enables significantly increased maximum rotor pole face flux density (e.g., at least a twenty percent (20%) increase compared to a comparable conventional spoked rotor motor, more preferably at least a thirty percent (30%) increase, and most preferably a forty percent (40%) increase or greater).

The motor 10 also maintains equivalent performance in both rotational directions despite being a non-symmetrical design.

Still further, it is noted that the motor 10 achieves an increase of at least ten percent (10%) and most preferably fifteen percent (15%) or more in back electromotive force (BEMF) compared to an equivalent stator paired with a conventional spoked rotor.

A second preferred embodiment of the present invention is illustrated in FIGS. 9-11. It is initially noted that, with certain exceptions to be discussed in detail below, many of the elements of the rotor 110 of the second embodiment are the same as or very similar to those described in detail above in relation to the motor 10 (and, in particular, the rotor 12 thereof) of the of the first embodiment. Therefore, for the sake of brevity and clarity, redundant descriptions and numbering will be generally avoided here. Unless otherwise specified, the detailed descriptions of the elements presented above with respect to the first embodiment should therefore be understood to apply at least generally to the second embodiment, as well.

Similarly to the rotor 12, the rotor 110 of the second preferred embodiment preferably includes a rotor core 112 and a plurality of magnets 114. The rotor core 112 preferably includes a plurality of arcuately spaced apart pole segments 116, each of which includes a body 118. The magnets 114 are disposed arcuately between adjacent ones of the pole segments 116.

The rotor core 112 preferably comprises a plurality of axially stacked rotor laminations 120. Each lamination 120 defines a portion 116a or "slice" of each of the pole segments 116.

Each lamination 120 further includes a plurality of ears 122 respectively extending from arcuately alternating ones of the corresponding portions of the bodies 118 of the pole segment portions 116a.

The laminations 120 further include connectors 124 extending between and interconnecting every other pair of adjacent pole segment portions 116a. As best shown in FIG. 10, the ears 122 are most preferably provided in association with pole segment portions 116a that are not interconnected to one another by connectors 124.

The laminations 120 are preferably each identical to one another but are rotated or "clocked" relative to one another by the arcuate span of a single pole segment 116, such that the connectors 124 are axially spaced apart (i.e., alternate with gaps) along the axial length of the rotor core 112.

Various connector configurations, including but not limited to provision of connectors between each pair of pole segment portions, clocking of laminations in axial groups rather than each individually relative to the others, clocking via larger or smaller angular rotations, and so on fall within the ambit of some aspects of the present invention. Generally, however, it is preferred that considerations are made both for structural soundness and magnetic performance.

Similarly to the rotor core 34 of the first preferred embodiment, the rotor core 112 also includes a hub 126 and bridges 128 extending between and interconnecting corresponding pole segments 116 to the hub 126. A plurality of nubs 130 also extend from the hub 126 toward corresponding ones of the magnets 114. In contrast to the rounded nubs 50 of the first preferred embodiment, however, the nubs 130 are generally rectangular in shape.

The magnets 114 of the second preferred embodiment are curved in their entirety, in contrast to the partially arcuate, partially straight magnets 36 of the first preferred embodiment. More particularly, each magnet 114 preferably defines a radially inner end 132 and a radially outer end 134 and curves continuously between the ends 132 and 134.

Continuous curvature of the magnets 114 between the ends 132 and 134 may in some instances improve ease of manufacturability relative to the magnets 36 of the first preferred embodiment.

Each magnet 114 preferably presents inner and outer curved faces 136 and 138, respectively, each of which presents a respective constant radius of curvature R1 or R2 so as to extend along a circular arc. The inner and outer curved faces 136 and 138 also preferably share a common center of curvature C.

A constant width W is defined between the inner and outer curved faces 136 and 138. Furthermore, each magnet 114 has an arcuate length L defined between the radially inner and outer ends 132 and 134 and along a magnet centerline. Alternatively characterized, each magnet 114 extends along the centerline for an angular arc length θ.

In a preferred embodiment, the radius of curvature R1 of the inner curved face 136 is between about five tenths (0.5) inches and about one and twenty-five hundredths (1.25) inches. Most preferably, the radius of curvature R1 of the inner curved face 136 is about eight hundred forty-eight thousandths (0.848) inches.

The radius of curvature R2 of the outer curved face 138 is preferably between about seventy-five hundredths (0.75) inches and about one and five tenths (1.5) inches. Most preferably, the radius of curvature R2 of the outer curved face 138 is about one and ninety-three thousandths (1.093) inches.

Preferably, the width W is between about fifteen hundredths (0.15) inches and about one (1) inch. Most preferably, the width W is about two hundred forty-four thousandths (0.244) inches.

The preferred length L is between about five tenths (0.5) inches and about two (2) inches. Most preferably, the length L is about one and three hundred fifty-nine thousandths (1.359) inches.

The arc length θ is preferably between about sixty (60) degrees and about one hundred (100) degrees. More preferably, the arc length θ is between about seventy (70) degrees and about ninety (90) degrees. Most preferably, the arc length θ is about eighty (80) degrees.

Preferably, the length L correlates to the radii of curvature R1 and R2. That is, an increase in the length L will be associated with an increase in the radii of curvature R1 and R2. It is preferable, for instance, that the length L is between about five tenths (0.5) and about three (3) times the radius R1, more preferably between about one (1) and about two (2) times the radius R1, and most preferably about one and six tenths (1.6) times the radius R1.

Similarly, it is preferable that the length L is between about five tenths (0.5) and about three (3) times the radius R2, more preferably between about one (1) and about two (2) times the radius R2, and most preferably about one and twenty-four hundredths (1.24) times the radius R1.

Furthermore, it is preferable that the length L is between about three (3) and about eight (8) times the width W, more preferably between about four (4) and about seven (7) times the width W, and most preferably about five and fifty-seven hundredths (5.57) times the width W.

The radially inner end 132 of each magnet presents a radially inner end face 140 of the magnet 114. The radially outer end 134 of each magnet 114 presents a radially outer end face 142 of the magnet 114.

The radially inner end face 140 includes primary and secondary straight faces 140a and 140b, respectively.

The radially outer end face 142 preferably includes a straight section 142a and a rounded section 142b. This is in contrast to the simple flat or straight end face 54 of the first preferred embodiment.

The rounded section 142b preferably presents a radius of curvature R3 between about five tenths (0.5) inches and about two (2) inches. Most preferably, the radius of curvature R3 is about nine hundred eighty-four thousandths (0.984) inches.

As will be readily apparent to those of ordinary skill in the art, the comparatively large-radiused rounded section 142b is readily distinguishable from a simple small-radiused rounded or chamfered edge as might be provided purely for manufacturing ease or clearance.

Proportionally, the radius of curvature R3 of the rounded section 142b is preferably between about five tenths (0.5) and about two (2) times the radius of curvature R1 of the inner curved face 120. More preferably, the radius of curvature R3 is between about seventy-five hundredths (0.75) and about one and five tenths (1.5) times the radius of curvature R1. Most preferably, the radius of curvature R3 is about one and sixteen hundredths (1.16) times the radius of curvature R1.

The provision of the rounded section 142b aids in improved back EMF characteristics, among other advantages in motor performance and manufacturing.

The primary straight face 140a of the radially inner end face 140 and the straight section 142a of the radially outer end face 142 are preferably angled relative to each other by an angle φ between about forty (40) degrees and about eighty (80) degrees. More preferably, the angle φ is between about fifty (50) degrees and about seventy (70) degrees. Most preferably, the angle φ is about sixty (60) degrees.

Figure 12:
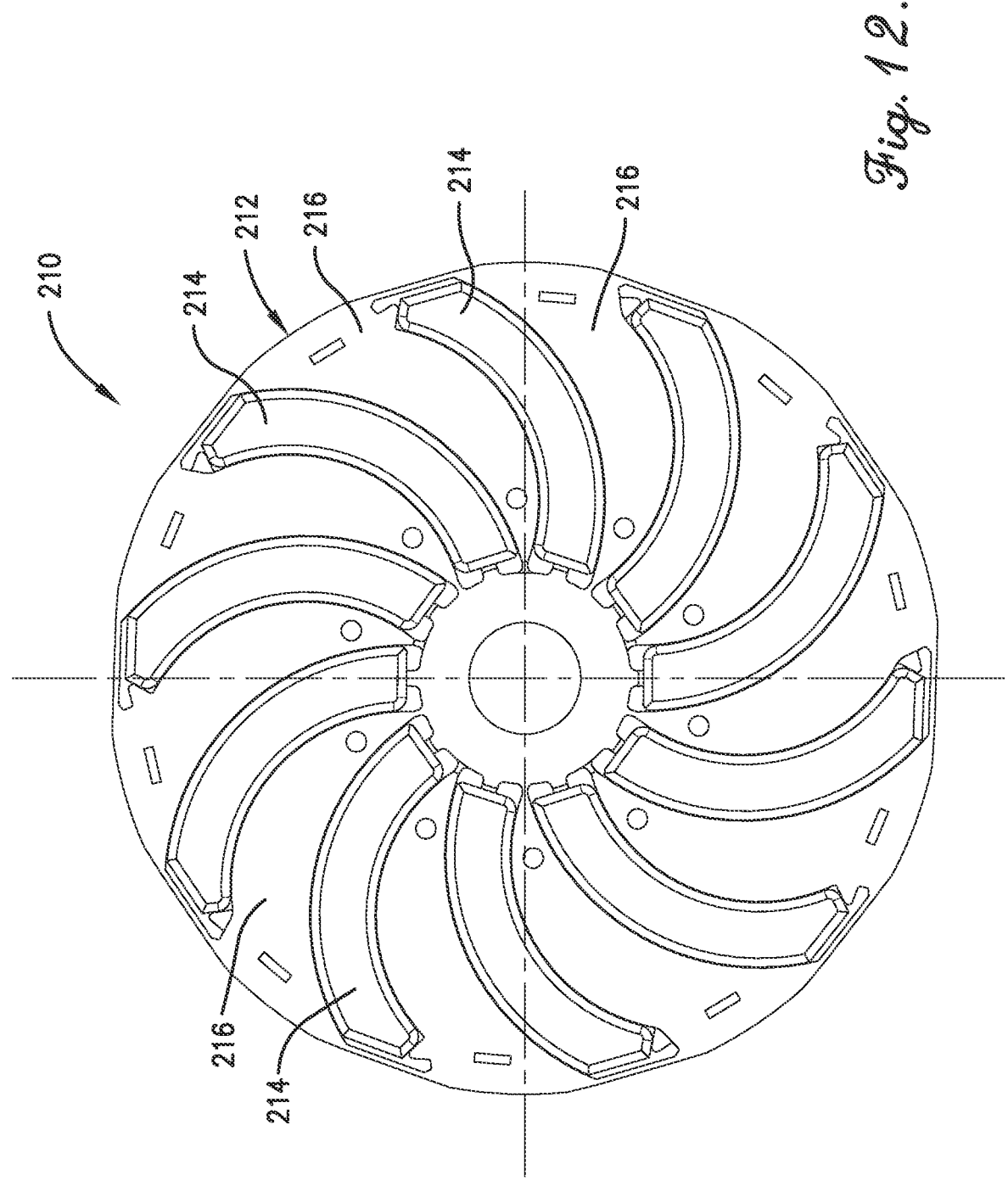
FIG. 12 is a front view of a rotor core and magnets in accordance with a third preferred embodiment of the present invention.
Figure 13:
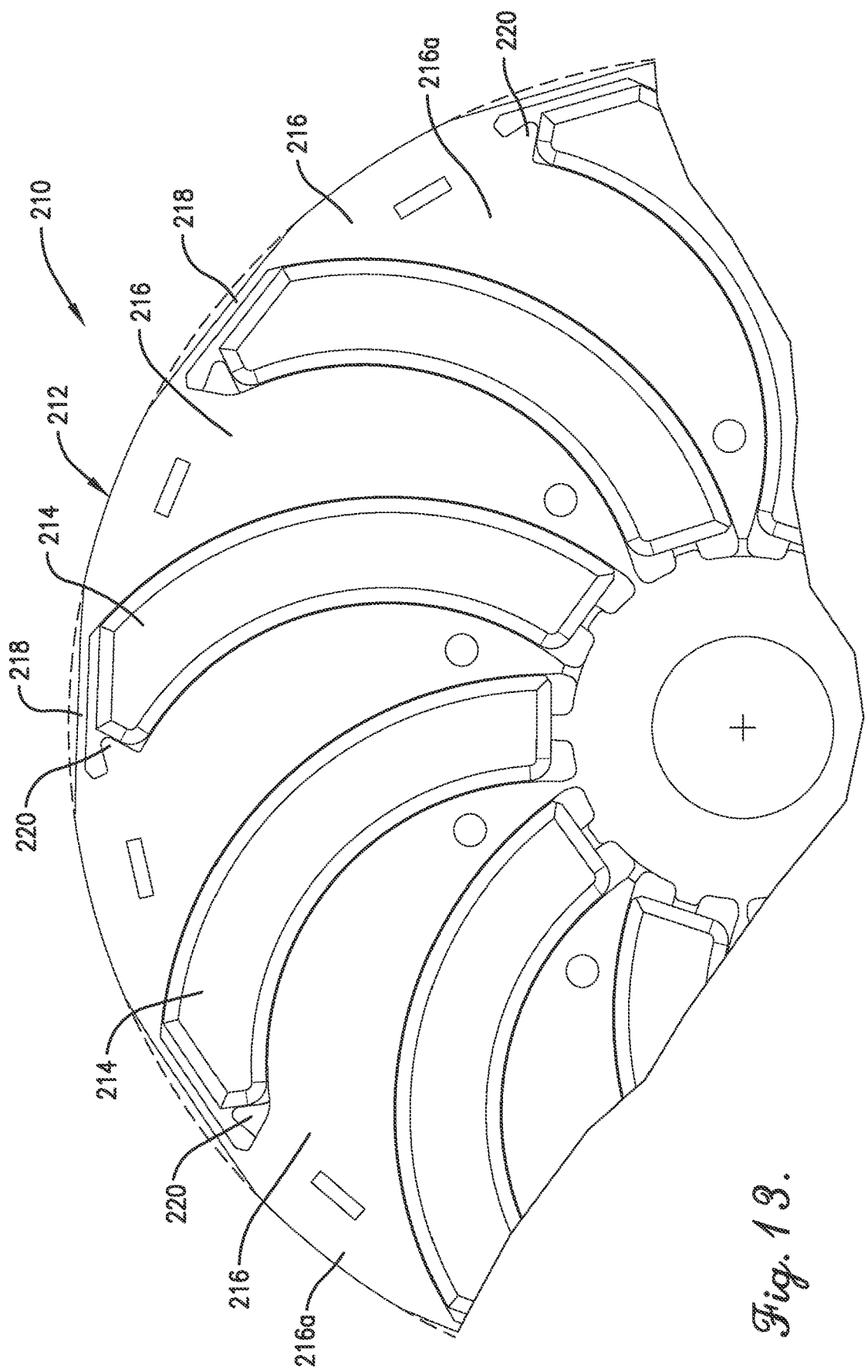
FIG. 13 is an enlarged front view of a portion of the rotor core and magnets of FIG. 12.
Figure 14:
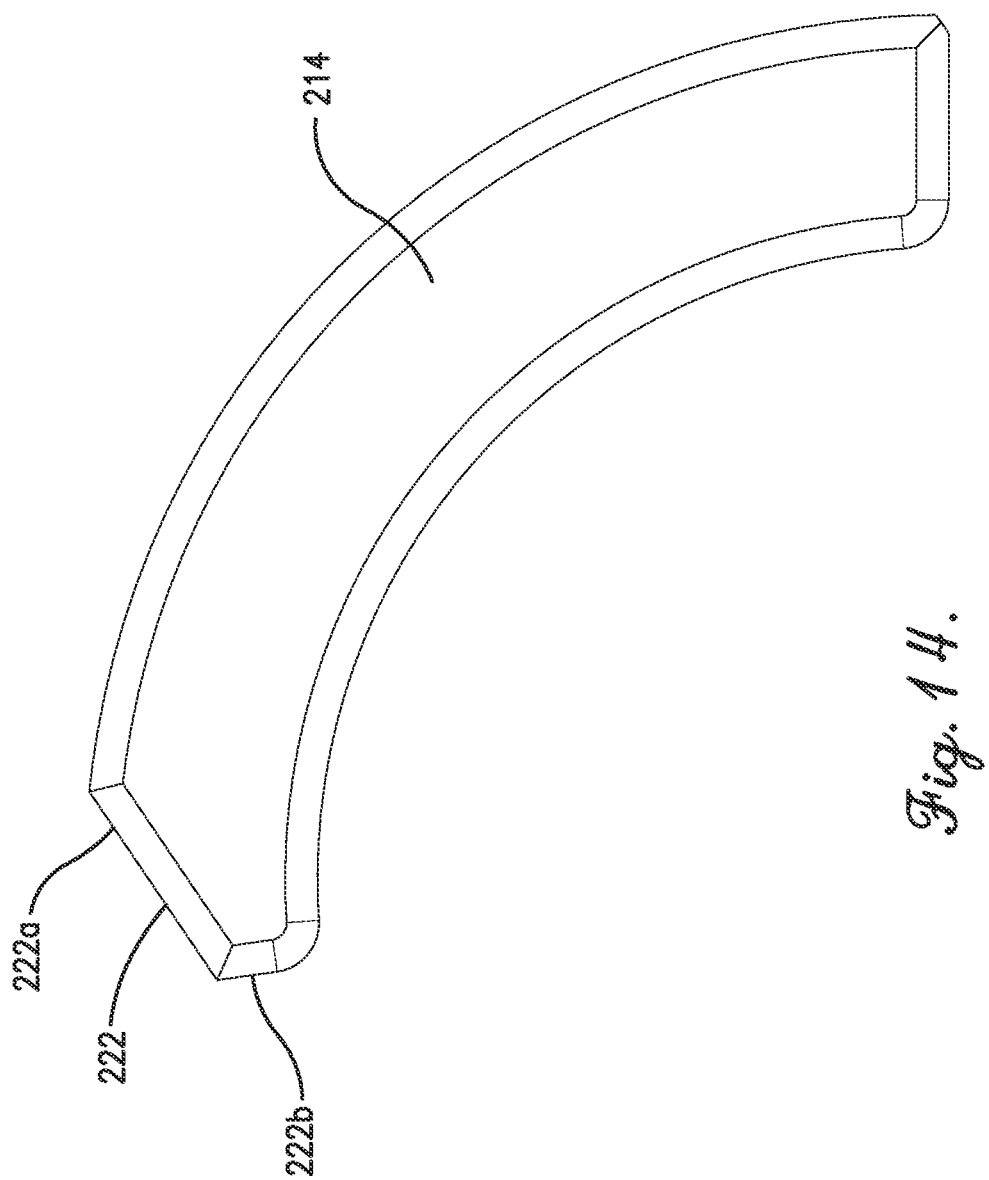
FIG. 14 is a front view of one of the magnets of FIGS. 12 and 13, particularly illustrating the proportions and general geometry thereof.

A third preferred embodiment of the present invention is illustrated in FIGS. 12-14. It is initially noted that, with certain exceptions to be discussed in detail below, many of the elements of the rotor 210 of the third embodiment are the same as or very similar to those described in detail above in relation to the motor 10 (and, in particular, the rotor 12 thereof) of the first embodiment and the rotor 110 of the second embodiment. Therefore, for the sake of brevity and clarity, redundant descriptions and numbering will be generally avoided here. Unless otherwise specified, the detailed descriptions of the elements presented above with respect to the first and second embodiments should therefore be understood to apply at least generally to the third embodiment, as well.

Similarly to the rotor 12 and the rotor 110, the rotor 210 of the third preferred embodiment preferably includes a rotor core 212 and a plurality of magnets 214. The rotor core 212 preferably includes a plurality of arcuately spaced apart pole segments 216. The magnets 214 are disposed arcuately between adjacent ones of the pole segments 216.

The rotor core 212 is preferably a laminated rotor core, with each pole segment 216 comprising a plurality of axially stacked pole segment portions 216a.

A connector 218 preferably extends between and interconnects each pair of adjacent pole segments 216.

The rotor core 212 also preferably includes a plurality of retention projections 220. In the illustrated embodiment, a retention projection 220 extends from arcuately alternating ones of the pole segment portions 216a to engage or nearly engage a corresponding magnet 214, with the laminations of the rotor core 212 being rotated relative to one another such that each magnet 214 is engaged or nearly engaged by a plurality of the retention projections 220.

Similarly to the magnets 114 of the second preferred embodiment, the magnets 214 of the third preferred embodiment are curved in their entirety. However, the magnets 214 of the third preferred embodiment include a radially outer end face 222 including a primary straight section 222a and a secondary straight section 222b. This is in contrast to the simple flat or straight end face 54a of the first preferred embodiment and the straight and rounded portions 142a and 142b, respectively, of the second preferred embodiment.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

Although the above description presents features of preferred embodiments of the present invention, other preferred embodiments may also be created in keeping with the principles of the invention. Furthermore, as noted previously, these other preferred embodiments may in some instances be realized through a combination of features compatible for use together despite having been presented independently as part of separate embodiments in the above description.

The inventors hereby state their intent to rely on the Doctrine of Equivalents to determine and access the reasonably fair scope of the present invention as pertains to any apparatus not materially departing from but outside the literal scope of the invention set forth in the following claims.

What is claimed is:

1. A spoked rotor rotatable about an axis, said rotor comprising:
   a core including a plurality of pole segments arranged arcuately about the axis; and
   a plurality of arcuately arranged magnets alternating arcuately with said pole segments, such that each of the magnets is at least in part interposed between a pair of adjacent pole segments,
   each of said magnets including a curved section extending arcuately between radially inner and outer ends,
   said curved section presenting opposite axially extending curved faces, each having a constant radius of curvature between the inner and outer ends, with spacing between the curved faces being constant the full length of the curved section.

2. The rotor as claimed in claim 1,
   one of said curved faces facing generally radially inward, another of said curved faces facing generally radially outward.

3. The rotor as claimed in claim 1
   said magnet having a total length,
   said curved section extending along a curved section centerline and having a curved section length defined along the curved section centerline,
   said curved section length being at least substantially equal to the total length.

4. The rotor as claimed in claim 1,
   each of said pairs of adjacent pole segments defining a slot therebetween,
   each of said slots including a magnet-receiving portion and a gap portion,
   said gap portion being at least substantially disposed radially outwardly of said magnet-receiving portion,
   each of said magnets being at least in part received within a corresponding one of said magnet-receiving portions, with each of the corresponding gap portions being devoid of the magnet.

5. The rotor as claimed in claim 1
   said curved section having an arc length between about 60 degrees and about 100 degrees.

6. The rotor as claimed in claim 5,
   said arc length being between about 70 degrees and about 90 degrees.

7. A spoked rotor rotatable about an axis, said rotor comprising:
   a core including a plurality of pole segments arranged arcuately about the axis; and
   a plurality of arcuately arranged magnets alternating arcuately with said pole segments, such that each of the magnets is at least in part interposed between a pair of adjacent pole segments,
   each of said magnets including a curved section extending arcuately between radially inner and outer ends,
   each of said magnets further including a straight section adjacent the curved section thereof,
   said curved section extending along a curved section centerline and having a curved section length defined along the curved section centerline,
   said straight section extending along a straight section centerline and having a straight section length defined along the straight section centerline,
   said magnet having a total length equal to the sum of the curved section length and the straight section length,
   said curved section length being at least 50% of the total length.

8. The rotor as claimed in claim 7,
   said curved section presenting opposite axially extending curved faces, each extending arcuately between the inner and outer ends.

9. The rotor as claimed in claim 8,
   said straight section presenting opposite axially extending straight faces, each extending from a corresponding one of the curved faces at the outer end.

10. The rotor as claimed in claim 9,
    each of said straight faces extending tangentially from the corresponding one of the curved faces at the outer end.

11. The rotor as claimed in claim 7,
    said curved section presenting opposite axially extending curved faces, each extending arcuately between the inner and outer ends, with spacing between the curved faces being constant the full length of the curved section,
    said straight section presenting opposite, parallel, axially extending straight faces.

12. The rotor as claimed in claim 7,
    said curved section length being between about 60% and about 90% of the total length.

13. A rotor rotatable about an axis, said rotor comprising:
    a core including a plurality of pole segments arranged arcuately about the axis; and
    a plurality of arcuately arranged magnets alternating arcuately with said pole segments, such that each of the magnets is at least in part interposed between a pair of adjacent pole segments,
    wherein an effective rotor pole location is defined on each of said pole segments, each of said pole segments having an end opposite the effective rotor pole location, wherein a center point is defined at said end, each of said effective rotor pole locations being arcuately offset from a corresponding one of the center points by between about 0.5 rotor poles and about 2.0 rotor poles.

14. The rotor of claim 13, each of said rotor poles being arcuately offset from the corresponding ones of the center points by between about 1.25 rotor poles and about 1.5 rotor poles.

15. The rotor of claim 13, said rotor core defining a radially outermost circumferential margin, each of said center points being spaced from said margin by a radial distance, each of said magnets extending along a magnet centerline having a total length, each of said total magnet lengths being at least 10% greater than a corresponding one of said radial distances.

16. The rotor of claim 13, each of said magnets including an arcuately extending curved section.

17. The rotor of claim 16, each of said magnets further including a straight section adjacent the curved section, said curved section extending along a curved section centerline and having a curved section length defined along the curved section centerline, said straight section extending along a straight section centerline and having a straight section length defined along the straight section centerline, said magnet having a total length equal to the sum of the curved section length and the straight section length, said curved section length being at least 50% of the total length.

18. The rotor of claim 16, said curved section extending arcuately between radially inner and outer ends, said curved section having an arc length between about 45 degrees and about 95 degrees.

19. The rotor of claim 16, said magnet having a total length, said curved section extending along a curved section centerline and having a curved section length defined along the curved section centerline, said curved section length being at least substantially equal to the total length.

20. The rotor of claim 16, said curved section presenting opposite axially extending curved faces, each having a constant radius of curvature between the inner and outer ends, with spacing between the curved faces being constant the full length of the curved section.

* * * * *